(12) United States Patent
Liu

(10) Patent No.: US 9,632,641 B2
(45) Date of Patent: Apr. 25, 2017

(54) TOUCH PANEL FOR DETERMINING REAL COORDINATES OF THE MULTIPLE TOUCH POINTS AND METHOD THEREOF

(71) Applicant: TPK Touch Solutions (Xiamen) Inc., Xiamen (CN)

(72) Inventor: Yong Liu, Singapore (SG)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 14/806,673

(22) Filed: Jul. 23, 2015

(65) Prior Publication Data

US 2015/0324038 A1   Nov. 12, 2015

Related U.S. Application Data

(62) Division of application No. 12/960,550, filed on Dec. 6, 2010, now Pat. No. 9,122,358.

(30) Foreign Application Priority Data

Aug. 15, 2010  (CN) .......................... 2010 1 0257478

(51) Int. Cl.
| | | |
|---|---|---|
| *G06F 3/044* | (2006.01) | |
| *G06F 3/047* | (2006.01) | |
| *G09G 5/00* | (2006.01) | |
| *G06F 3/041* | (2006.01) | |

(52) U.S. Cl.
CPC .............. *G06F 3/044* (2013.01); *G06F 3/047* (2013.01); *G06F 3/0416* (2013.01); *G09G 5/003* (2013.01); *G06F 2203/04808* (2013.01); *G09G 2300/0426* (2013.01)

(58) Field of Classification Search
CPC ..................... G06F 3/041; G06F 3/044; G06F 2203/04112; G06F 2203/04111
USPC ......... 345/173–178; 178/18.01–18.09, 18.11
See application file for complete search history.

(56) References Cited

U.S. PATENT DOCUMENTS

| | | | |
|---|---|---|---|
| 2008/0150906 A1* | 6/2008 | Grivna ................. | G06F 3/0416 345/173 |
| 2009/0146970 A1* | 6/2009 | Lowles ................. | G06F 3/044 345/174 |
| 2010/0026660 A1* | 2/2010 | Kitamura ............... | G06F 3/044 345/174 |
| 2011/0032193 A1* | 2/2011 | Szalkowski ............ | G06F 3/044 345/173 |

\* cited by examiner

*Primary Examiner* — Stephen Sherman
(74) *Attorney, Agent, or Firm* — Cooper Legal Group, LLC

(57) ABSTRACT

A touch panel for determining real coordinates of multiple touch points is provided. The touch panel for determining real coordinates of multiple touch points comprises a sensing path layer having a plurality of first paths and a plurality of second paths for detecting the raw coordinates of said multiple touch points, and an Eliminating Path Layer having a plurality of third paths for eliminating ghost coordinates of said multiple touch points from said raw coordinates to output said real coordinates of said multiple touch points. The method of determining real coordinates of multiple touch points on the touch panel is also provided.

16 Claims, 8 Drawing Sheets

TOUCH PANEL FOR DETERMINING REAL COORDINATES OF THE MULTIPLE TOUCH POINTS AND METHOD THEREOF

This application is a Divisional Application of Ser. No. 12/960,550, filed Dec. 6, 2010, now pending, by the present inventors, which is incorporated herein by reference.

BACKGROUND OF THE INVENTION

Field of the Invention

The present invention relates to a touch device for determining real coordinates during detecting raw coordinates of the multiple touch points and method thereof.

Description of the Related Art

During the recent two decades, touch technologies have gained acceptance in a variety of consumer applications, such as touch screens in ATMs (automated-teller machines), track pads in laptop computers, and scroll wheels in media players. In these consumer applications, the movement of an object such as a finger or a stylus along a surface of a touch sensor is detected by the touch sensor to generate electrical signals for the subsequent processes.

There are many types of touch sensing methods, such as resistive sensing type, capacitive sensing type, acoustic wave sensing type, optical sensing type and the like. For the capacitive sensing method, the touch sensor perceives touch locations by detecting the change in capacitance due to the proximity of a conductive object such as metal or a part of human body. The capacitive touch sensors are classified into a projective capacitive type and a surface capacitive type. The projective capacitive touch sensor contains a lattice electrode pattern, while the surface capacitive touch sensor includes electrodes formed on peripheral edges of a continuous conductive sheet.

FIG. 1 and FIG. 2 show a conventional projective capacitive touch panel 1 comprising a plurality of first electrodes 2 in the first direction, a plurality of second electrodes 3 in the second direction, an insulator 4 and a substrate 5. The plurality of first electrodes 2 and the plurality of second electrodes 3 are intersected with each other to form a lattice pattern placed on the substrate 5. The insulator 4 is arranged between the plurality of first electrodes 2 and the plurality of second electrodes 3. Besides, a processor (not shown) is connected to the plurality of first electrodes 2 and the plurality of second electrodes 3. When a conductive object such as a finger or stylus is touching or moving on the projective capacitive touch panel 1, the change in self capacitance produced on both first electrodes 2 in the first direction and second electrodes 3 in the second direction can be transmitted and then processed by the processor. The centroids of the change in self capacitance indicate the locations of the touch point in the first direction and the second direction of the projective capacitive touch panel 1. The coordinate of the touch point is calculated by intersecting the centroids in the first direction and the second direction. In other words, the conventional method of detecting touch point comprises: (a) scanning both the first electrodes 2 in the first direction and the second electrodes 3 in the second direction; (b) computing centroids of the change in self capacitance in the first direction and the second direction; and (c) calculating the coordinate of the touch point based on the centroids.

FIG. 3 shows that when two touch points C, D appear on the surface of the projective capacitive touch panel 1, two centroids 6a, 6b will be detected on the first electrodes 2, while two centroids 7a, 7b will be detected on the second electrodes 3. Thus, four raw coordinates C(6a,7a), D'(6a, 7b), D'(6b,7a) D(6b,7b) are formed, two of which are real coordinates and the other two are ghost coordinates.

The acoustic touch sensor comprises an element for emitting sound wave and another element for receiving the sound wave, which causes the sound waves to be transmitted across the surface of the touch sensor. The touch of an object absorbs some energy of the wave, which can be detected at the touch location. The optical touch sensor works in the similar way to the acoustic touch sensor, except that the wave transmitting along the surface is light wave such as infra-red wave. Drawing on the above sensing method, the acoustic touch panel and the optical touch panel could use sensing paths in two directions to calculate the coordinate of the touch point. Thus, when more than one touch points present on the acoustic or optical touch panel, the ghost coordinates will be inevitable.

As a result, the conventional projective capacitive touch panel, the acoustic touch panel, or the optical touch panel would have the appearance of the ghost coordinates that limits the application and operation of these touch panels for determining multiple touch points. Therefore, it is necessary to eliminate ghost coordinates during the process of determining multiple touch points on those touch panels mentioned above.

SUMMARY OF THE INVENTION

It is an objective of the present invention to provide a touch panel for determining multiple touch points which can eliminate the ghost coordinates from the raw coordinates of the touch points to determine the real coordinates.

The touch panel for determining real coordinates of multiple touch points comprises a sensing path layer having a plurality of first paths and a plurality of second paths for detecting the raw coordinates of said multiple touch points, and an Eliminating Path Layer having a plurality of third paths. This layer, with plurality of third paths disposed along a third direction which does not coincide with direction of the first paths and direction of the second paths, is for eliminating ghost coordinates of said multiple touch points from said raw coordinates of said multiple touch points to output said real coordinates of said multiple touch points (herein referred to as "Eliminating Path Layer").

It is another objective of the present invention to provide a method of determining real coordinates of multiple touch points.

The method of determining real coordinates of multiple touch points comprises: (a) scanning a plurality of first paths in a first direction and a plurality of second paths in a second direction of a sensing path layer, when at least two touch points appear; (b) computing centroids of changes in self capacitances corresponding to said touch points in both said first direction and said second direction, and calculating raw coordinates of said touch points by intersecting said centroids; (c) scanning a plurality of third paths in a thud direction of an Eliminating Path Layer, when at least two said centroids are computed in both said first direction and said second direction in said step (b); (d) computing projections of said touch points in said third direction; (e) calculating, projections of said raw coordinates of said touch points in said third direction; (f) comparing a distance between each said projections of said touch points and each said projections of said raw coordinates of said touch points with a threshold value; and (g) outputting said raw coordinates of said touch points as real coordinates of said touch points, if said distance is smaller than said threshold value in said step (f).

By means of the present invention, a touch panel can eliminate the ghost coordinates and output the real coordinates during the process of determining multiple touch points to overcome the disadvantage of these conventional touch panels.

BRIEF DESCRIPTION OF THE DRAWINGS

The skilled artisan will understand that the drawings, described below, are for illustration purposes only. The drawings are not intended to limit the scope of the present teachings in any way. Like reference numerals designate corresponding parts throughout the several views.

FIG. 4b is a schematic top view of the sensing path layer of FIG. 4a;

FIG. 4c is a schematic top view of the Eliminating Path Layer of FIG. 4a;

FIG. 5 is a schematic exploded plan view of a touch input device having the touch panel of FIG. 4a;

FIG. 6B is a schematic top view of the sensing path layer of FIG. 6a;

DETAILED DESCRIPTION OF THE EMBODIMENTS

Figure 1:
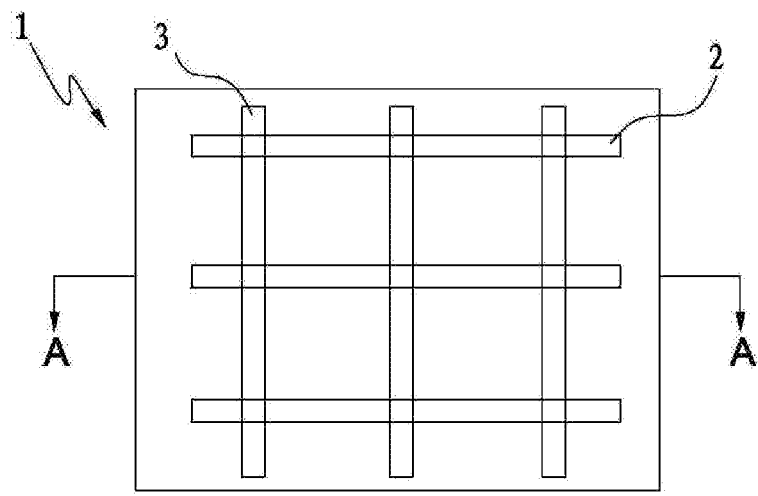
FIG. 1 is a schematic top view of a conventional projective capacitive touch panel.
Figure 2:
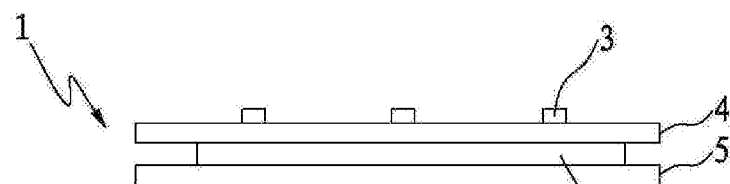
FIG. 2 is a schematic sectional view taken on the line A-A of FIG. 1.
Figure 3:
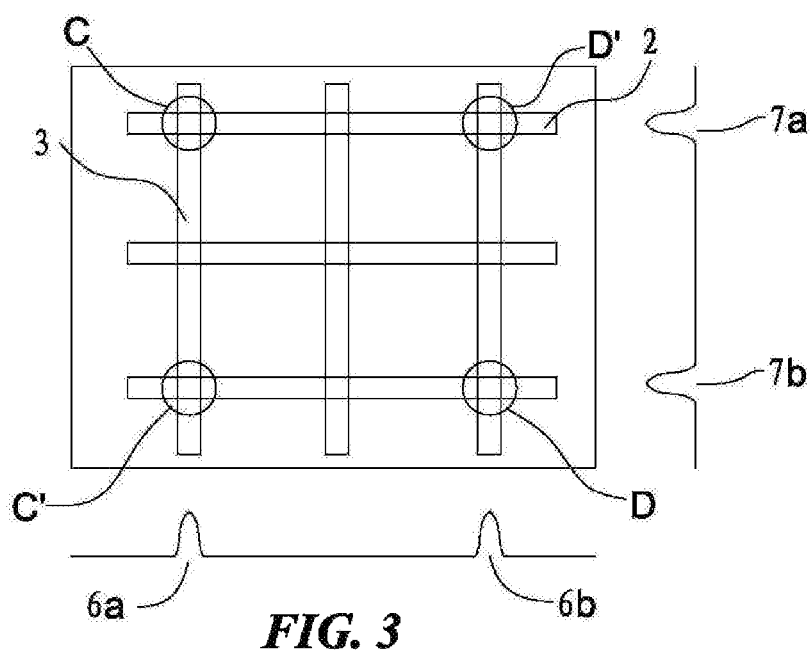
FIG. 3 is a schematic view of two touch points appearing, on the conventional projective capacitive touch panel of FIG. 1.
Figure 4A:
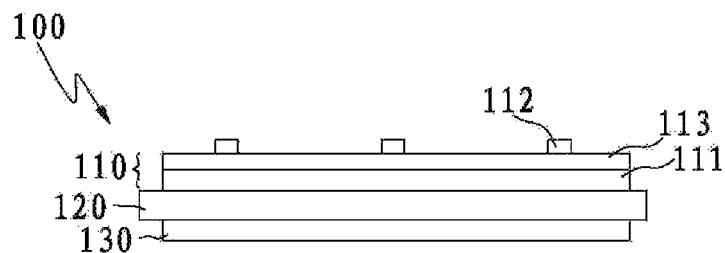
FIG. 4a is a schematic sectional view of the touch panel according to the first embodiment of the present invention.
Figure 4B:
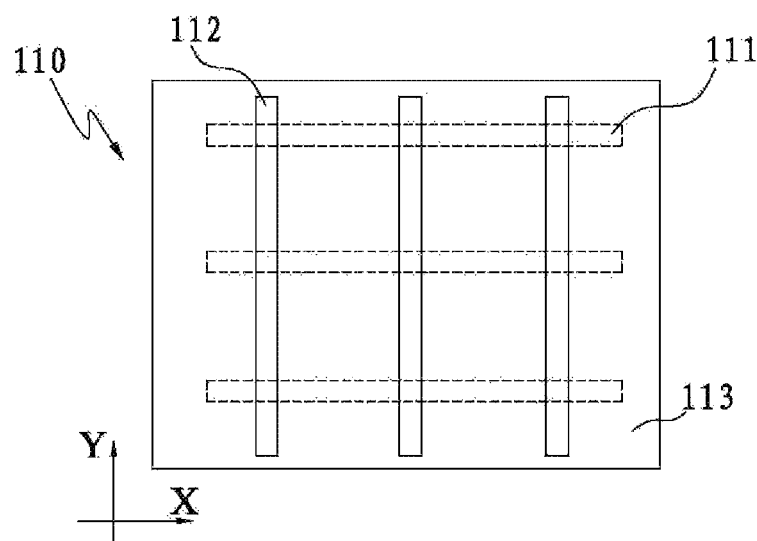
Figure 4C:
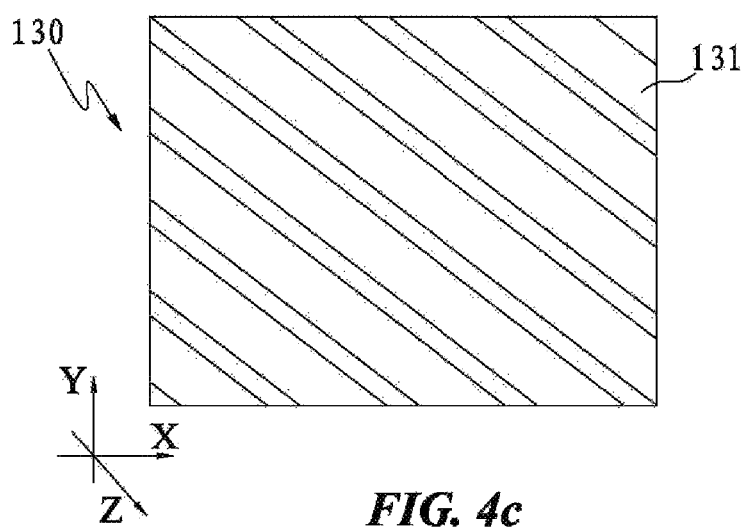

FIG. 4a shows the touch panel 100 for determining real coordinates a multiple touch points in accordance with the first embodiment of the present invention, which is based on the projective capacitive touch sensing method. The touch panel 100 comprises a sensing path layer 110 and an Eliminating Path Layer 130 facing to the sensing path layer 110. The sensing path layer 110 includes a plurality of first electrodes 111, a plurality of second electrodes 112 and an insulating layer 113. As shown in FIG. 4b, the first electrodes 111 are disposed along the first direction X on one surface of the insulating layer 113, while the second electrodes 112 are disposed along the second direction Y on another surface of the insulating layer 113 opposite to the first electrodes 111. The direction X is vertical to the direction Y. FIG. 4c shows that the Eliminating Path Layer 130 includes a plurality of third electrodes 131 disposed along the third direction Z which does not coincide with the first direction X or the second direction Y. In order to insulate the sensing path layer 110 from the Eliminating Path Layer 130, an insulating substrate 120 is introduced into the touch panel 100 and located between layers 110 and 130.

Figure 5:
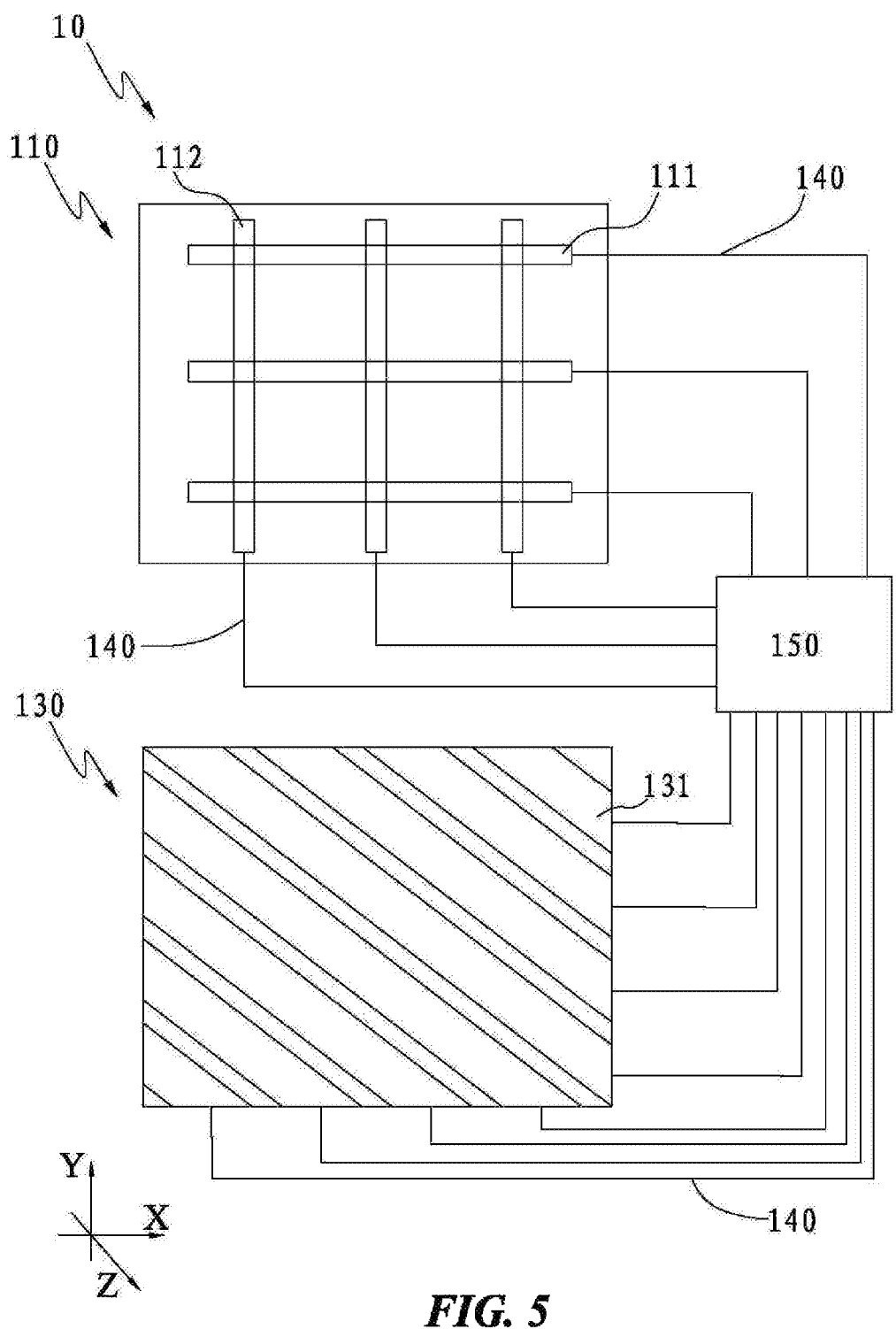

FIG. 5 shows a touch input device 10 for determining real coordinates of multiple touch points comprising the sensing path layer 110 having the first electrodes 111 and the second electrodes 112, the Eliminating Path Layer 130 having the third electrodes 131, wires 140 and a processor 150. The first electrodes 111, the second electrodes 112 and the third electrodes 131 are connected to the processor 150 by wires 140.

Figure 6A:
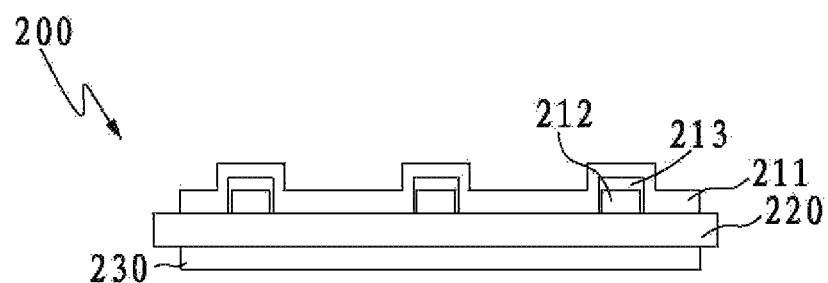
FIG. 6a is a schematic sectional view of the touch panel according to the second embodiment of the present invention.
Figure 6B:
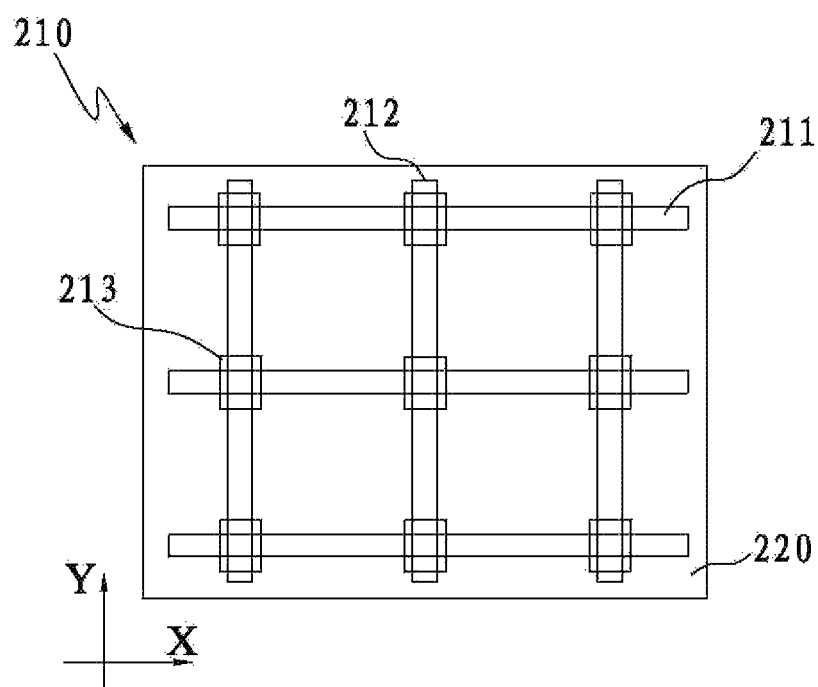

FIG. 6a illustrates the touch panel 200 for determining real coordinates of multiple touch points in accordance with the second embodiment of the present invention, which is also based on the projective capacitive touch sensing method. The touch panel 200, similarly to the touch panel 100, comprises a sensing path layer 210 having a plurality of first electrodes 211 and a plurality of second electrodes 212, an Eliminating Path Layer 230 having a plurality of third electrodes (not shown) which take on the same form as that of 131 of FIG. 4c. and facing to the sensing path layer 210, and an insulating substrate 220 located between the sensing path layer 210 and the Eliminating Path Layer 230. The difference is that the first electrodes 211 and the second electrodes 212 intersect on the same surface of the insulating substrate 220 to form a plurality of intersections. In order to insulate the first electrodes 211 from the second electrodes 212, a plurality of insulating elements 213 are located at the intersections of the first electrodes 211 and the second electrodes 212, as shown in FIG. 6b.

Figure 7:
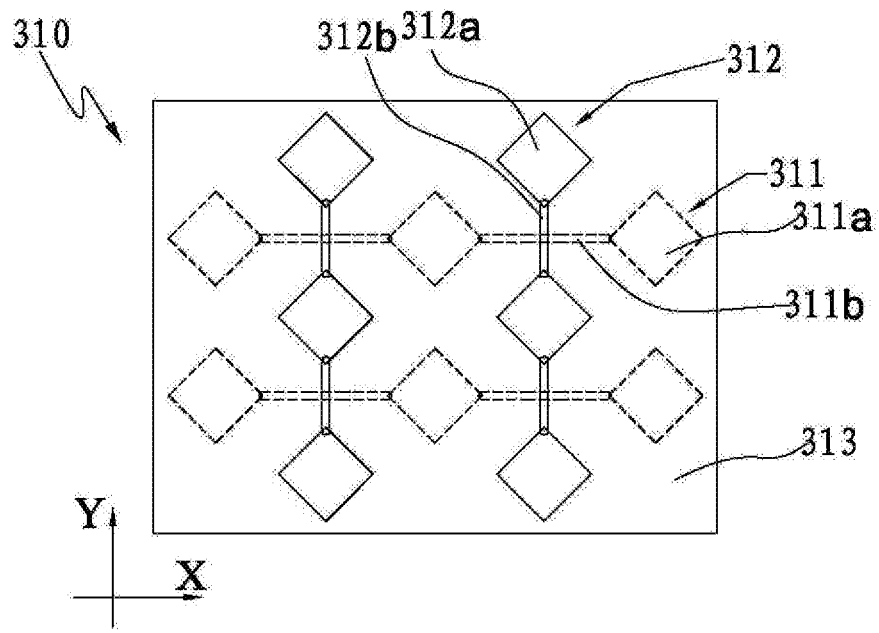
FIG. 7 is a schematic sectional view of the sensing path layer of the touch panel according to the third embodiment of the present invention.

The layout of the first electrodes and the second electrodes of the sensing path layer may be different from that in accordance with the first embodiments. FIG. 7 presents the sensing path layer 310 of the touch panel in accordance with the third embodiment of the present invention. Similar to the sensing path layer 110 of the touch panel 100, the sensing path layer 310 includes a plurality of first electrodes 311, a plurality of second electrodes 312, and an insulating layer 313 between the first electrodes 311 and the second electrodes 312. In particular, the first electrodes 311 contain a plurality of separate first conductive cells 311a and a plurality of first conductive lines 311b connecting the first conductive cells 311a, while the second electrodes 312 contain a plurality of separate second conductive cells 312a and a plurality of second conductive lines 312b connecting the second conductive cells 312a. The other components of the touch panel according to the third embodiment of the present invention are the same as those of the touch panel 100 mentioned above. The first conductive cells 311a and the second conductive cells 312a are of shape of any geometry contours and are made of transparent conductive materials.

Figure 8:
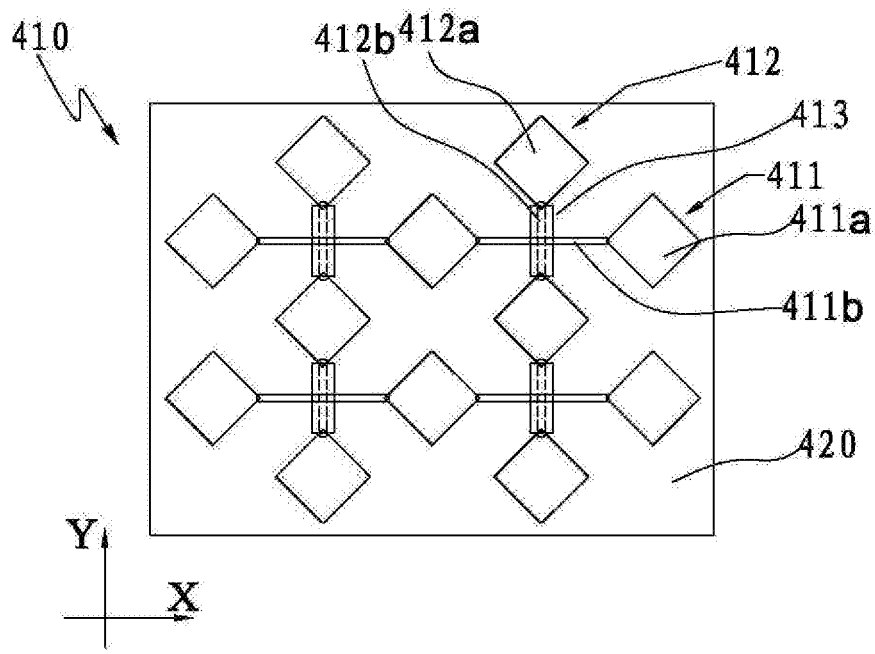
FIG. 8 is a schematic sectional view of the sensing path layer of the touch panel according to the fourth embodiment of the present invention.

FIG. 8 shows the sensing path layer 410 of the touch panel in accordance with the fourth embodiment of the present invention. Similar to the sensing path layer 210 of the touch panel 200, the sensing path layer 410 includes a plurality of first electrodes 411, a plurality of second electrodes 412, and a plurality of insulating elements 413 insulating the first electrodes 411 from the second electrodes 412. In particular, the first electrodes 411 contain a plurality of separate first conductive cells 411a and a plurality of first conductive lines 411b connecting the first conductive cells 411a, while the second electrodes 412 contain a plurality of separate second conductive cells 412a and a plurality of second conductive lines 412b connecting the second conductive cells 412a. The first conductive cells 411a are separated from each other by the second conductive cells 412a and the second conductive lines 412b. The insulating elements 413 are placed between the first conductive cells 411a and the second conductive cells 412a. The other components of the touch panel according to the fourth embodiment of the present invention are the same as those of the touch panel 200 mentioned above.

According to various design requirements, the amount of the first conductive cells and the second conductive cells is at least two, while the amount of the first conductive lines and the second conductive lines is at least one.

The touch panel of the present invention for determining real coordinates of multiple touch points may utilize the optical touch sensing method. The sensing path layer comprises a plurality of first optical paths disposed along the first direction X and a plurality of second optical paths disposed along the second direction Y. Besides, the Eliminating Path Layer includes a plurality of third optical paths in the third direction Z. Compared with the above-mentioned projective capacitive touch panel, the first optical paths, the second optical paths and the third optical paths are separated from each other and are disposed on different layers. Unlike the electrical signals transmitted in conductive medium for the projective capacitive touch panel, the optical wave can be transmitted in the air for the optical touch panel. Given this feature of the optical wave, the first optical paths, the second optical paths and the third optical paths can also be arranged in the same layer. In this way, a processor connected to the optical touch panel could make switch among the first optical paths, the second optical paths and the third optical paths, in order to present the first optical paths, the second optical paths and the third optical paths in turn according to the requirement called for in determining the real coordinates of multiple touch points. Having a similar principle as the optical touch panel, the touch panel for determining real coordinates of multiple touch points of the present invention can be utilized with the acoustic wave touch sensing method. The paths of the acoustic wave touch panel are the acoustic wave path. Moreover, the structure of the optical touch panel is the same as that of the acoustic wave touch panel.

Being applied in various touch input devices, the touch panel in the present invention may be opaque, e.g., the touch pads of the laptop computer, or it may be transparent, e.g. the touch screen of the cell phone. The first electrodes, the second electrodes and the third electrodes are made of conductive material, while the insulating layer, the insulating substrate and the insulating elements are made of insulating material. The opaque conductive material could be selected from copper, alumina, gold and other metals, while the transparent conductive material could be Indium Tin Oxides (ITO), Aluminum-doped zinc Oxide, transparent conductive oxides and so on. The insulating material could be plastic, glass and so on.

In the present invention, the first direction X does not coincide with the second direction Y. The first paths are substantially parallel to each other. In the same way, the second paths are also substantially parallel to each other, and so are the third paths.

Of the first paths, the second paths and the third paths, there are at least two paths in each of the three directions in the present invention. The resolution and the size of the touch panel in the present invention are the main factors influencing the number of paths. Normally, higher resolution or larger size requires more paths.

Figure 9:
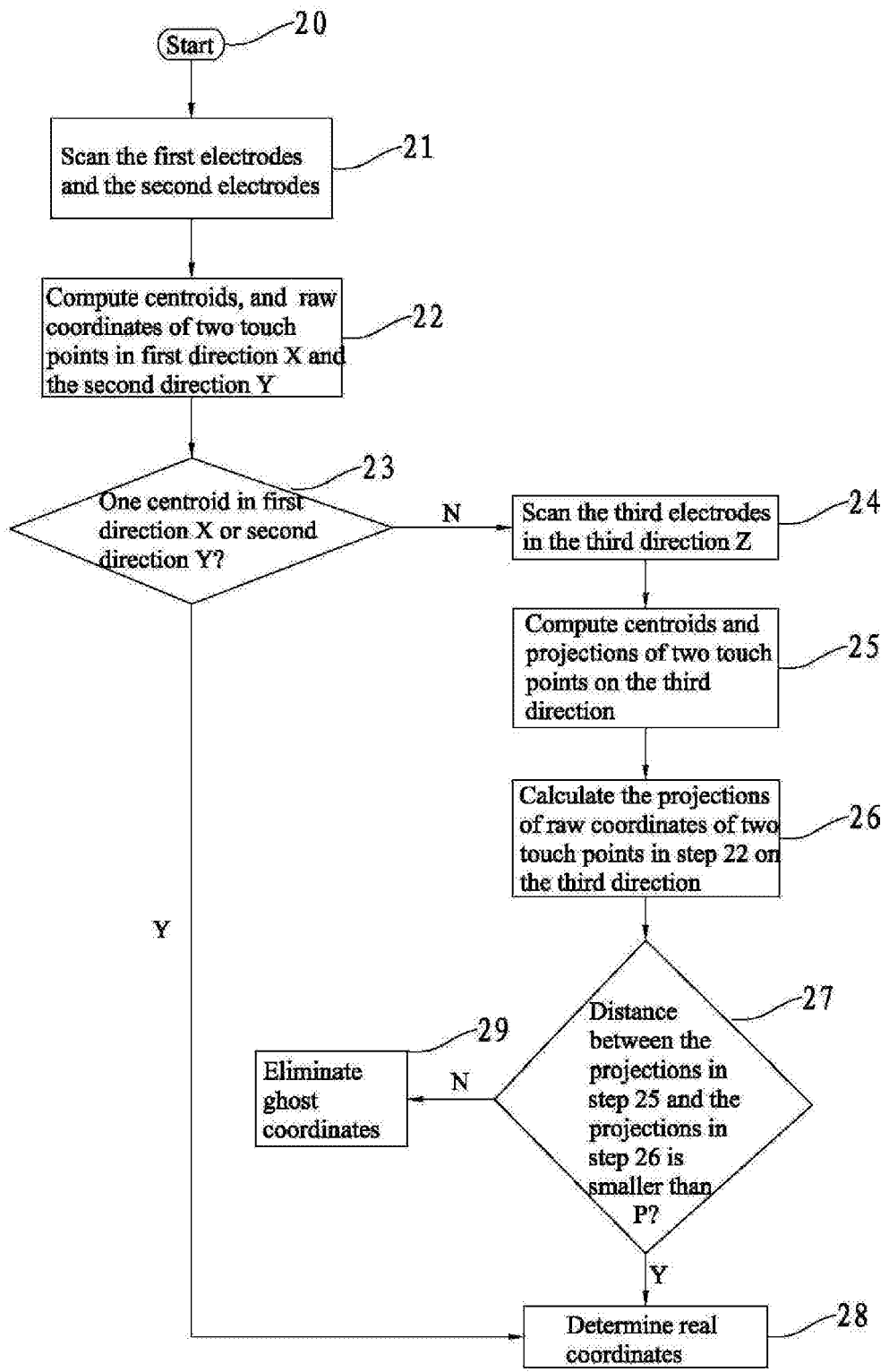
FIG. 9 is a flow chart of determining real coordinates of multiple touch points on the touch panel of the present invention.
Figure 10:
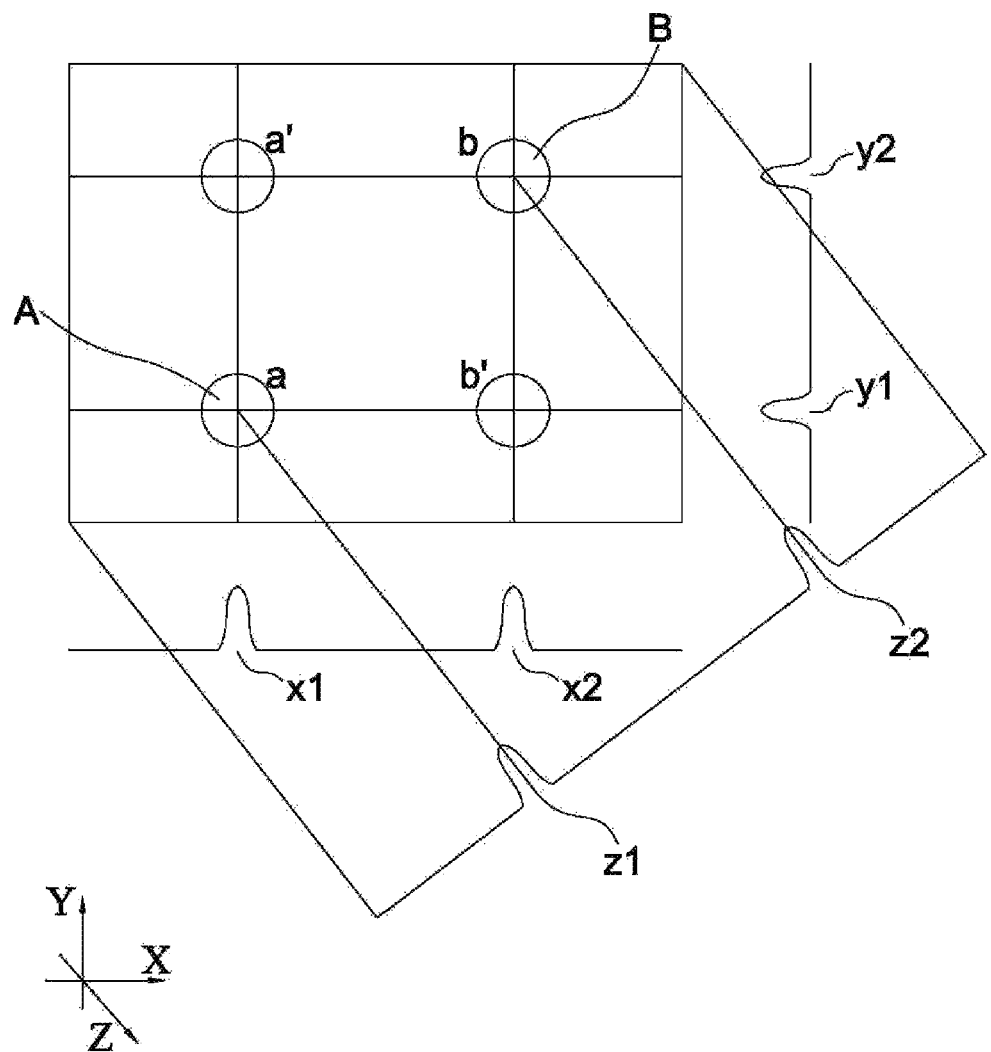
FIG. 10 is a schematic view of four raw coordinates of two touch points appearing on the touch panel of the present invention.

When at least two touch points appear on the surface of the touch panel for determining real coordinates of multiple touch points in the present invention, the real coordinates of the touch points can be determined by using the method of determining real coordinates of multiple touch points shown in FIG. 9. The situation of two touch points appearing on the surface of the projective capacitive touch panel is taken as an example, referring to FIG. 10. The process begins at step 20 where the touch panel is in standby. When two touch points, A and B, appear on the surface of the touch panel, the process proceeds to step 21.

In step 21, the processor respectively applies the scanning signal to the first electrodes and the second electrodes in the sensing path layer through wires, and scans the first electrodes in the first direction X and the second electrodes in the second direction Y. The signals representing the changes in the self-capacitance in both the first direction X and the second direction Y caused by two touch points are transmitted to the processor. Before performing step 21, the third electrodes in the Eliminating Path Layer are shorted together and connected to ground or an active output to act as a shield, which is utilized to block the electromagnetic interference created during scanning the electrodes in the sensing path layer.

Step 22 is implemented, in which the centroids $x1$, $x2$ of change in self capacitance corresponding to two touch points A, B in the first direction X and the centroids $y1$, $y2$ of change in self capacitance corresponding to two touch points A, B in the second direction Y are computed by the processor, based on the signals representing the changes in the self-capacitance created in step 21. By intersecting the centroids $x1$, $x2$, $y1$, $y2$, two pairs of raw coordinates $a(x1,y1)$, $b(x2,y2)$ and $a'(x1,y2)$, $b'(x2,y1)$ are calculated.

After step 22, it is determined whether only one centroid is computed in either the first direction X or the second direction Y in step 23. If only one centroid is computed, proceed to step 28. If two centroids are computed in both the first direction X and the second direction Y, which presents that $x1$ is not equal to $x2$ and $y1$ is not equal to $y2$, the process proceeds to step 24.

In step 24, the processor transmits the scanning signal to the third electrodes of the Eliminating Path Layer through wires, and scans the third electrodes in the third direction Z. The signals representing the changes in the self capacitance in the third direction Z caused by two touch points are transmitted to the processor. When performing step 24, the first electrodes and the second electrodes in the sensing path layer are floating to avoid the interference.

Figure 11:
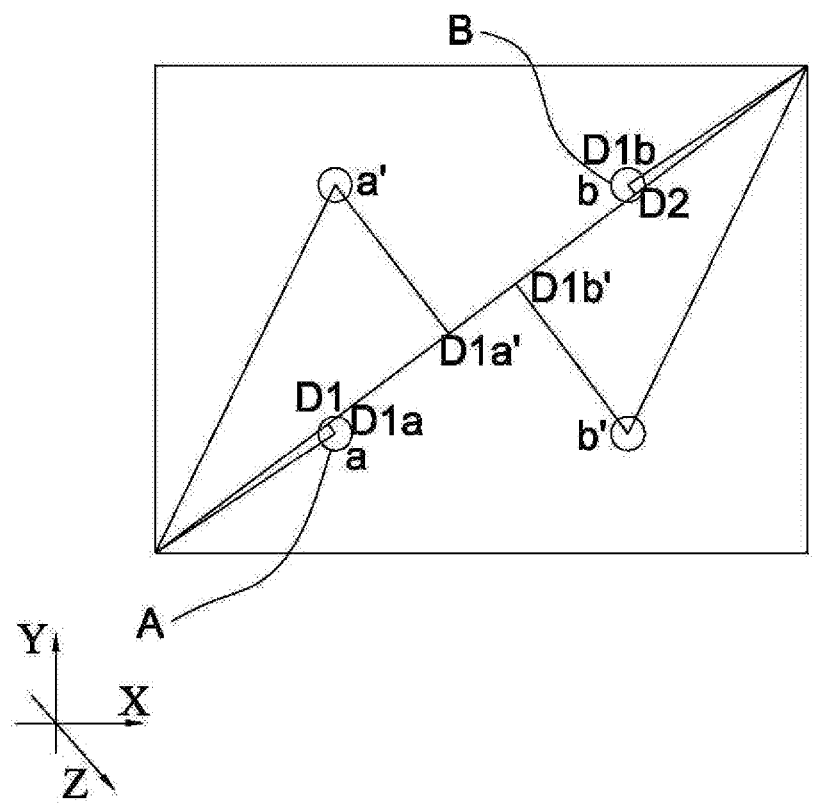
FIG. 11 is a schematic view of the projection of the raw coordinates of two touch points in FIG. 10 in the third direction.

Step 25 is implemented, in which the centroids $Z1$, $Z2$ and the projections $D1$, $D2$ of two touch points A, B in the third direction Z are computed by the processor, based on the signals representing the changes in the self capacitance created in step 24. Referring to FIG. 11, two projections $D1$, $D2$ are the real projections of two touch points A, B.

In step 26, the projections $D1a$, $D1b$ and $D1a'$, $D1b'$ in the third direction Z of the two pairs of raw coordinates $a(x1,y1)$, $b(x2,y2)$ and $a'(x1,y2)$, $b'(x2,y1)$ in step 21 are calculated by the processor, referring to FIG. 11.

After step 26, it is determined whether the distance between any of the projections $D1$, $D2$ and any of the projections $D1a$, $D1b$ and $D1a'$, $D1b'$ is smaller than a threshold value P in step 27. If the distance is smaller than the threshold value P, the process proceeds to step 28 where the raw coordinates of two touch points are outputted as the real coordinates of two touch points. Otherwise, it proceeds to step 29 where the raw coordinates of two touch points is eliminated as the ghost coordinates of two touch points. For example, if the distance between projection D1 and projection D1a is smaller than the threshold value P, the raw coordinate a(x1,y1) in accordance with the projection D1a is the real coordinate of the touch point A. On the contrary, for explanation purpose not considering FIG. 11, if the distance between projection D1 and projection D1a is larger than the threshold value P, the raw coordinate a(x1,y1) would be the ghost coordinates of the touch point A. In the same way, the raw coordinate of the touch point B can be found out. In addition, the threshold value could be defined in different ways according to various requirements, such as pixel number. The scope of the threshold value P is set depending on the experimental data. For example, the threshold value P could be at least one pixel.

In step 23, If only one centroid is computed in either the first direction X or the second direction Y, which represents that x1 is equal to x2 or y1 is equal to y2, it means that only two coordinates can be calculated in step 22. Thus, no ghost coordinates of two touch points occur during the process of detecting two touch points, and these two coordinates are the real coordinates of two touch points A, B which are outputted in step 28.

The processor mentioned above comprises scanning unit, computing unit, comparing unit and outputting unit. The scanning unit is used to provide scanning signal to paths and receive the electric signal creating during scanning the paths, such as the signal representing the change in the self capacitance. The computing unit performs the role of computing centroid and calculating projection. In the comparing unit, any values, such as distances, are compared with the threshold value. The results, such as the real coordinates of the touch points, are outputted by the outputting unit.

The method of determining real coordinates of two touch points mentioned above can also be utilized into determining real coordinates of more than two touch points. The more touch points appear, the more ghost coordinates are eliminated and the more distances are compared with the threshold value P in step 27.

The real coordinates of multiple touch points can be outputted to a control device or display for following executions. The receiver and the following executions are not limited in the present invention.

In addition, the method of determining real coordinates of multiple touch points can be implemented in optical touch panel and acoustic wave touch panel.

One of multiple touch points of the above-mentioned present invention is located on at least one intersection of the first paths and second paths.

While certain embodiments have been shown and described, various modifications and substitutions may be made thereto without departing from the spirit and scope of the invention. Therefore, it is to be understood that the present invention has been described by way of illustration and not limitations.

What is claimed is:

1. A method of determining real coordinates of multiple touch points, comprising steps of:
   (a) scanning a plurality of first paths in a first direction and a plurality of second paths in a second direction of a sensing path layer when at least two touch points appear on a surface of a touch device and shorting and connecting a plurality of third paths in a third direction of an Eliminating Path Layer to ground;
   (b) computing centroids of changes in self capacitances corresponding to said touch points in both said first direction and said second direction, and calculating raw coordinates of said touch points by intersecting said centroids;
   (c) scanning said plurality of third paths when at least two said centroids are computed in both said first direction and said second direction in said step (b);
   (d) computing projections of said touch points in said third direction;
   (e) calculating projections of said raw coordinates of said touch points in said third direction;
   (f) comparing a distance between each said projections of said touch points and each said projections of said raw coordinates of said touch points with a threshold value; and
   (g) outputting said raw coordinates of said touch points as real coordinates of said touch points, if said distance is smaller than said threshold value in said step (f).

2. The method of determining real coordinates of multiple touch points of claim 1, wherein said Eliminating Path Layer acts as a shield.

3. The method of determining real coordinates of multiple touch points of claim 1, wherein said step (c) further comprises floating said plurality of first paths and said plurality of second paths of said sensing path layer.

4. The method of determining real coordinates of multiple touch points of claim 1, wherein said threshold value is at least one pixel.

5. The method of determining real coordinates of multiple touch points of claim 1, wherein said step (g) further comprises eliminating said raw coordinates of said touch points as ghost coordinates of said touch points, if said distance is larger than said threshold value in step (f).

6. The method of determining real coordinates of multiple touch points of claim 1, further comprising applying a scanning signal to said plurality of first paths and said plurality of second paths.

7. The method of determining real coordinates of multiple touch points of claim 6, further comprising applying said scanning signal to said plurality of third paths in the step (c).

8. The method of determining real coordinates of multiple touch points of claim 1, wherein said sensing path layer is insulated from said Eliminating Path Layer.

9. A method of determining real coordinates of multiple touch points, comprising steps of:
   (a) scanning a plurality of first paths in a first direction and a plurality of second paths in a second direction of a sensing path layer when at least two touch points appear on a surface of a touch device and shorting and connecting a plurality of third paths in a third direction of an Eliminating Path Layer to an active output;
   (b) computing centroids of changes in self capacitances corresponding to said touch points in both said first direction and said second direction, and calculating raw coordinates of said touch points by intersecting said centroids;
   (c) scanning said plurality of third paths when at least two said centroids are computed in both said first direction and said second direction in said step (b);
   (d) computing projections of said touch points in said third direction;
   (e) calculating projections of said raw coordinates of said touch points in said third direction;
   (f) comparing a distance between each said projections of said touch points and each said projections of said raw coordinates of said touch points with a threshold value; and (g) outputting said raw coordinates of said touch points as real coordinates of said touch points, if said distance is smaller than said threshold value in said step (f).

10. The method of determining real coordinates of multiple touch points of claim 9, wherein said Eliminating Path Layer acts as a shield.

11. The method of determining real coordinates of multiple touch points of claim 9, wherein said step (c) further comprises floating said plurality of first paths and said plurality of second paths of said sensing path layer.

12. The method of determining real coordinates of multiple touch points of claim 9, wherein said threshold value is at least one pixel.

13. The method of determining real coordinates of multiple touch points of claim 9, wherein said step (g) further comprises eliminating said raw coordinates of said touch points as ghost coordinates of said touch points, if said distance is larger than said threshold value in step (f).

14. The method of determining real coordinates of multiple touch points of claim 9, further comprising applying a scanning signal to said plurality of first paths and said plurality of second paths.

15. The method of determining real coordinates of multiple touch points of claim 14, further comprising applying said scanning signal to said plurality of third paths in the step (c).

16. The method of determining real coordinates of multiple touch points of claim 9, wherein said sensing path layer is insulated from said Eliminating Path Layer.

* * * * *